May 20, 1969 A. RYBA 3,444,763
PLANET WHEELS-CHANGE GEAR FOR AUTOMOTIVE VEHICLES
Filed Dec. 18, 1967 Sheet 1 of 3
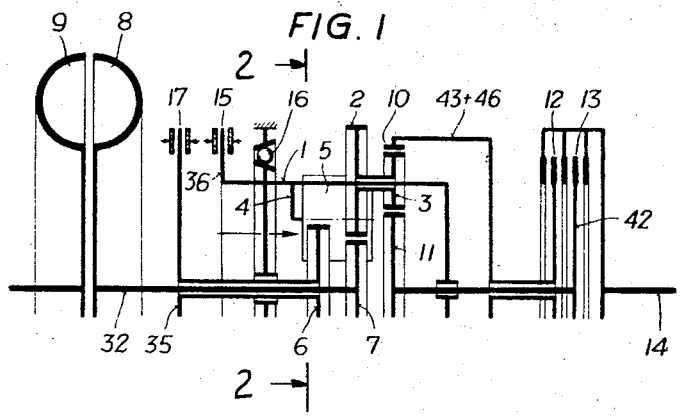
FIG. 1
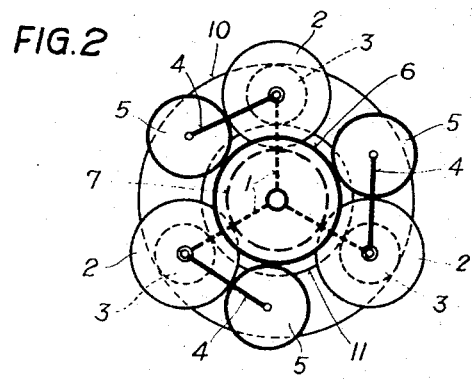
FIG. 2
FIG. 4
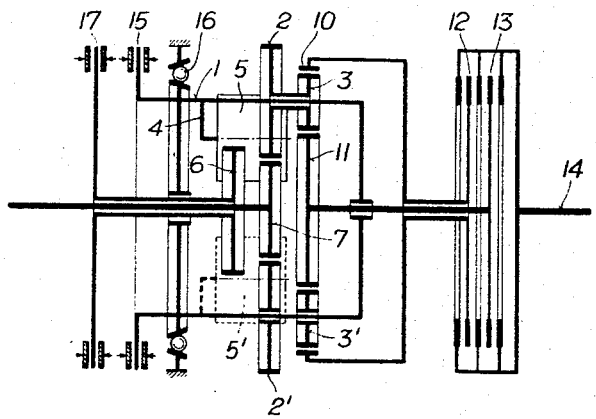
Inventor
Anton Ryba
By Ernest Montague
attorney May 20, 1969  A. RYBA  3,444,763
PLANET WHEELS-CHANGE GEAR FOR AUTOMOTIVE VEHICLES
Filed Dec. 18, 1967  Sheet 3 of 3

United States Patent Office 3,444,763
Patented May 20, 1969

3,444,763
PLANET WHEELS-CHANGE GEAR FOR
AUTOMOTIVE VEHICLES
Anton Ryba, Freiheitsstrasse 57/21, Bozen, Italy
Filed Dec. 18, 1967, Ser. No. 691,440
Claims priority, application Austria, Dec. 22, 1966,
A 11,767/66
Int. Cl. F16h 57/10
U.S. Cl. 74—763                              7 Claims

ABSTRACT OF THE DISCLOSURE

A planetary wheel change-gear drive having four forward drives and a reverse drive for automotive vehicles, which comprises a housing. An input shaft and an output shaft are both coaxially rotatably mounted in the housing. A plurality of planetary gears are provided. A web is provided for rotatably mounting the planetary gears about the axis of the shafts. A first sun gear is provided having outer teeth and operatively connected with the input shaft. A ring gear is also provided having inner teeth. A third sun gear is also provided having outer teeth. The first ring and third sun gears are rotatably mounted about the axis of the shafts. Means are provided for coupling the ring and third sun gears individually as well as jointly with the input shaft. The planetary gears include at least one first planetary gear, at least one second planetary gear, and at least one third planetary gear. The first planetary gear engages the first sun gear and is coaxially mounted with the second planetary gear. The ring and third sun gears engage simultaneously the second planetary gear. The first planetary gear has a diameter smaller than that of the secondary planetary gear. The first planetary gear is rigidly connected with the second coaxially disposed planetary gear. Means are provided for braking the web to the housing. A second sun gear is also provided. Additional means are provided for braking the second sun gear to the housing. The third planetary gear has a greater width than that of the other of the planetary gears and engages the second sun gear as well as the first planetary gear.

The present invention relates to a planetary wheel-change-gear drive for automotive vehicles.

The present planetary wheel-change-gear drives applied in automotive vehicles, which drives are preferably automatically controlled, perform their task insufficiently only, if they have more than three forward drives and one reverse drive.

They require for the formation of the individual transmission steps too many brake- and coupling-members, respectively, and are in addition very complicated, which leads to a great expense and prohibits a broader application.

It is one object of the present invention, to provide a planetary wheels-change-gear drive for automotive vehicles which avoids the drawbacks of the known structures and which provides a simpler planetary wheel-change-gear drive which complies with the practical requirements and which has four forward drives and one reverse drive.

It is another object of the present invention to provide planetary wheel-change-gear drives for automotive vehicles, wherein a transmission of such type is provided, which requires lower manufacturing costs than the known, comparable transmissions, by reducing the number of the required gears to a minimum and wherein the finishing of the gears does not require such high precision as before.

With these and other objects in view which will become apparent in the following detailed description, the present invention will be clearly understood in connection with the accompanying drawings, in which:

FIGURE 1 is a schematic longitudinal section of such planetary wheels-change-gear drive for automotive vehicles, showing substantially the upper half only;

FIG. 2 is a schematic section along the lines 2—2 of FIG. 1;

FIG. 4 is a schematic axial section of a simplified planetary wheels-change-gear drive for automotive vehicles.

Figure 3:
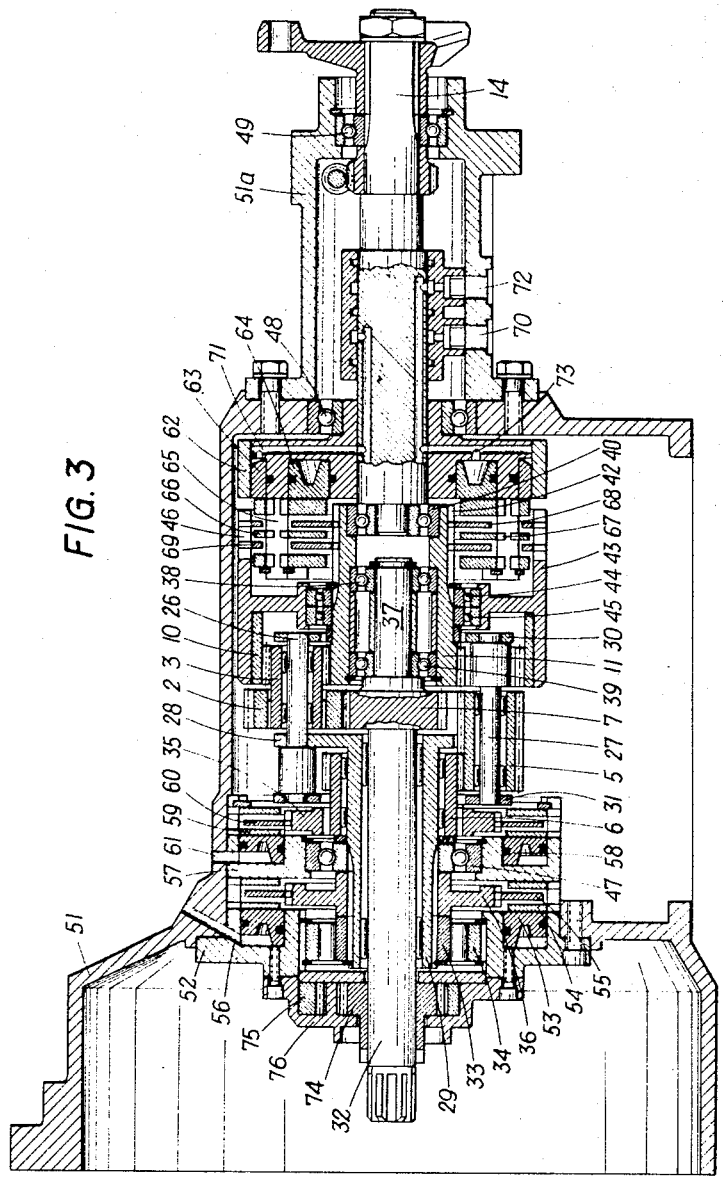
FIG. 3 is an axial section of a constructive embodiment of the drive shown in FIGS. 1 and 2.

Referring now to the drawings, and in particular to FIGS. 1 and 2, the drive comprises a web 1 on which three sets of planetary gears 2 and 3 each are rotatably mounted. The planetary gears 2 and 3 have different diameters and are rigidly connected together. Furthermore, on the web 1 are rotatably mounted on separate planetary axles 4, planetary gears 5 of a double width. The planetary gears 5 of double width engage, on the one hand, the planetary gears 2 and, on the other hand, a sun gear 6. The planetary gears 2 engage an additional sun gear 7 which is connected with one part 8 of a hydraulic coupling consisting of parts 8 and 9. The other part 9 is connected with a driving motor (not shown). The planetary gears 3 engage, on the one hand, a ring gear 10 having inner teeth and, on the other hand, a third sun gear 11 having outer teeth. The ring gear 10 and the third sun gear 11 can alternately or simultaneously be connected with the driven shaft 14 by means of couplings 12 and 13. The web 1 can be retained in a housing (not shown) selectively, by means of a brake 15 or by means of a free wheel friction-lock 16 and the sun gear 6 by means of a brake 17.

As can easily be ascertained from FIG. 2, one set of three planetary gears 2 and 5, respectively, is provided, each of which engage on the one hand, a planetary gear of the other set and one of the sun gears 6 and 7, respectively.

The structural embodiment, disclosed in FIG. 3, corresponds also with the schematic arrangement of the drive.

The rigidly connected planetary gears 2 and 3 are rotatably mounted on the web (bearing numeral 1 in FIG. 1), the latter comprising here the parts 26 to 31. The planetary gears 2 engage the sun gear 7 and the planetary gears 3 engage the inner toothed rim 10 and the sun gear 11. The planetary gears 5 of double width are rotatably mounted on the planetary axles 27 and engage, on the one hand, the planetary gears 2 and, on the other hand, the sun gear 6. A long hub 29 is secured on a web portion 28 connecting the planetary axles 26 and 27, and two closing plates 30 and 31 are secured on the outer ends of the planetary axles 26 and 27. The web 1 is rotatably mounted on the driving shaft 32 by means of its long hub 29, with which driving shaft 32 is also rigidly connected the sun gear 7.

An inner ring 33 of the free wheel friction pawl gear 16 is also connected with the long hub 29 of the web 1, while an outer ring 34 of this free wheel friction pawl gear 16 is rigidly connected with the housing 51. On the long hub 29 is furthermore also rotatably mounted the sun gear 6. For securing the web 1 serves a catch member 36, which engages a brake (numeral 15 in FIG. 1), the brake comprising an annular piston 53, hydraulically axially displaceable in an annular groove of the housing part 52, outer friction discs 54 and an inner friction disc 55, which engages the catch member 36. The pressurized oil is fed through a channel 56 of the housing 51.

A catch member 35 is rigidly connected with the sun gear 6 by means of which catch member 35, the sun gear 6 can be retained in the housing by a further brake (numeral 17 in FIG. 1). This brake comprises an annular piston 58 hydraulically axially displaceable in an annular groove of the housing part 57, outer friction discs 59 and an inner friction disc 60, which engages the catch member 35. The pressurized oil is fed by means of a channel 61 of the housing 51. The housing parts 52 and 57 sit rigidly on the outer housing 51. The driving shaft 32 has an extension 37, on which the sun gear 11 is rotatably mounted by means of bearings 38 and 39. The sun gear 11 carries on its extended part a bearing 40, in which the driven shaft 14 is rotatably mounted. The sun gear 11 has on its axial extension wedge grooves 42, by means of which it can be connected with the driven shaft 14 by means of a coupling (numeral 13 in FIG. 1), which will be set forth below.

The inner toothed ring gear 10 sits on a catch member 43 and is rotatably mounted on the sun gear 11 by means of bearings 44 and 45. The catch member 43 has claws 46, by means of which it can be coupled with the driven shaft 14 by means of a coupling (numeral 12 in FIG. 1), as will be explained below. The entire planetary gear is mounted in the housing 51 and 51a by means of bearings 47, 48 and 49.

The coupling between the ring and sun gears 10 and 11 and the driven shaft 14 comprises a coupling body 62 rigidly connected with the driven shaft 14, which coupling body 62 has two concentrically disposed annular grooves, in which the two axially displaceable annular pistons 63 and 64 are inserted. The coupling body 62 has also claw-like projections 65, which engage, on the one hand, the outer friction discs 66 and, on the other hand, the inner friction discs 67. In the groove 42 of the sun gear 11 engage the inner friction discs 68 and in the claws 46 of the catch member 43 the outer friction discs 69. The pressurized oil is fed to the outer coupling 63, 66 and 69 through the channels 70 and 71 and to the inner coupling 64, 67 and 68 through the channels 72 and 73.

A gear pump serves the production of pressurized oil for the disc couplings and disc brakes, which gear pump comprises the two gears 74 and 75 which are disposed in the housing part 76.

The operation of the present device is now disclosed in connection with FIGS. 1 and 2 as follows:

If, for instance, by means of the brake 17 the sun gear 6 is retained in the driving housing by means of the catch member 35 and the sun gear 7 is driven by means of the coupling 8 and the driving shaft 32 by a motor, a predetermined number of revolutions is given for the web 1, which results from the number ratio of the teeth of the gears 6 and 7.

Since thus the web 1 has a forced number of revolutions, the planetary gears 2 and 3 must also join this rotation and accordingly also the ring gear 10 and the sun gear 11. If now the ring gear 10 is connected by means of the coupling 12 with the driven or output shaft 14, the first forward speed is switched in. Upon releasing the brake 17 from the catch member 35 and releasing the coupling 12 from the catch member 43 the gear is again idling. If now the web is retained by means of the catch member 36 due to the brake 15 in the driving housing and the sun gear 11 is connected with the driven shaft 14 by means of the wedge grooves 42 and the coupling 13, the second forward speed is set. If the brake 15 is released from the catch member 36 and the coupling of the sun gear 11 connects by means of the brake 13 the driven shaft 14, the free wheel friction pawl gear 16 becomes effective because the web 1 would have the tendency of a reverse rotation, this lock, however, prevents such reverse rotation of the web 1. The second forward speed is thus switched on due to the effect of the free wheel friction pawl gear 16. For the setting of the third forward speed, the sun gear 11 can remain coupled with the driven shaft 14 and again, as in the first forward speed, the sun gear 6 is retained in the drive by means of the catch member 35 by means of the corresponding brake 17. If now the fourth forward speed is to be set, the brakes 15 and 17 to the catches 35 and 36 (sun gear 6 and web 1) are released and the ring gear 10 and the sun gear 11 are connected simultaneously by means of the catch members 42 and 43, respectively, by means of the corresponding couplings 12 and 13 with the driven shaft, whereby the rotating drive set rotates as a unit. If finally the web 1 is retained over the catch member 36 by means of the brake 15 in the housing and the ring gear 10 is coupled over the catch member 43 with the driven shaft 14, the reverse drive is switched on because the direction of rotation of the sun gear 10 reverses upon retaining the web 1.

The number of the planetary gears and planetary axles of each set is selective. The arrangement of an idling is not basically required for the formation of the individual transmission steps, however, this arrangement has operational advantages particularly for automatic switching, as soft switching and switching without interruption of the pulling force.

The planetary wheel gear change drive disclosed in FIG. 4 with four forward drives and one reverse drive has, save a few differences, the same structure as that in FIGS. 1 and 2, for which reason also the same parts are identified with the same numerals 1 to 17. The differences are as follows: In addition to the planetary gears 2 and 3 of the first and of the second planetary gear sets, respectively, no two additional planetary gears of this set are provided, rather only one, namely the planetary gears 2' and 3', respectively, which sit on a common planetary gear axle and which contrary to the gears 2 and 3, are not connected with each other, rather they are rotatable independently from each other. Also, the third set of planetary gears has only two gears, namely the planetary gears 5 and 5' which are disposed diametrically opposite each other. The sun gears 6, 7 and 11 and ring gear 10 are provided in the same manner and are in engagement with the mentioned planetary gears in the same manner, as described in connection with FIGS. 1 and 2. The arrangement of these planetary gear sets and of the corresponding sun gears is also apparent from FIGS. 5, 6 and 7. By the reduction of the number of the planetary gears, the production costs of the drive are appreciably reduced in an advantageous manner. Due to the fact that the coupled pair of gears 2 and 3, which constitute a step gear is present only once and the planetary gears 2' and 3' are not coupled with each other, it is possible, to perform the manufacture with appreciably less precision, which likewise reduces the costs.

Figure 8:
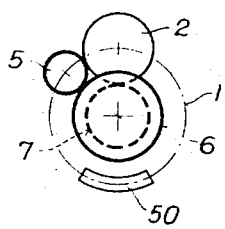
Figure 9:
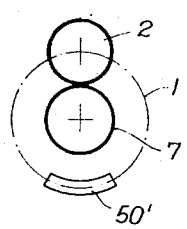
Figure 10:
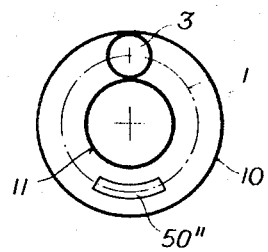

It is possible to go one step further, in case the calculation for a certain output to be transmitted indicates that only a single planetary gear suffices for the transmission, and to provide a single set instead of a first, second and third set of planetary gears, as it is shown in FIGS. 8, 9 and 10. In order to obtain nevertheless, balanced masses, in this case a balance weight 50, 50' and 50'' is arranged opposite the single present planetary gear.

Figure 11:
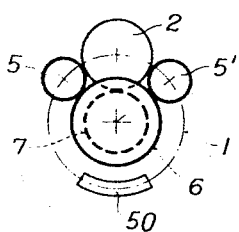

FIG. 11 shows finally a variation, in which only a first planetary gear 2, however, two third planetary gears 5 and 5' are arranged at both sides of the first planetary gear, which both third gears are in mesh with the planetary gear 2, whereby in addition, a balance weight 50 is disposed oppositely thereof.

If the calculation indicates, that at one point a single planetary gear suffices and at another position two or more planetary gears are required, in order to transmit the occurring output, in one planetary gear set can be used of course, only one gear, in another set two and still in another set three or more planetary gears, as it appears just necessary. In this way the gear sets shown in FIGS. 5 to 11 can be combined in any selective manner.

The effect of the above-described planetary gear drives is exactly the same, as it has been described in connection with FIGS. 1 to 3. It is merely necessary to provide a lesser number of gears for the transmission of the output, so that the energy flow varies in some cases.

Figure 7:
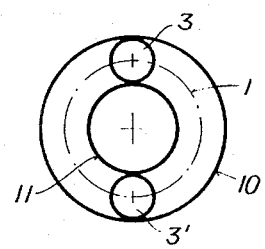

If, for instance, the gear combination according to FIGS. 8, 9 and 10, is present and the second speed is switched on, the energy flows from gear 7 over the gear 2 and gear 3 to gear 11 and from there to the driven shaft 14. The gears 5 and 6 idle thereby. If, for instance, the gear combination according to FIGS. 8, 9 and 7 present, and the second speed is switched on, the energy flows from gear 7 over gear 2 to gear 3 and there the energy flow is divided and in particular from gear 3 directly to gear 11 and from gear 3 over the gears 10 and 3' to gear 11. The gears 5 and 6 idle again.

If, for instance, the gear combination according to FIGS. 11, 9 and 10 is given, then in the second forward drive the energy flow is the same as in the gear combination according to FIGS. 8, 9 and 10 and the gears 5, 5' and 6 idle. If, however, the first or the the third speed is switched on, the gear group according to FIG. 11 starts to be operative and participates on the energy transmission, whereby the presence of two planetary gears 5 and 5' on both sides of the planetary gear 2, has as a consequence, that the double number of teeth are simultaneously in mesh, which results naturally in a gerater rigidity, and thereby also in higher transmission capability.

Figure 5:
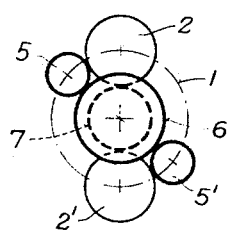
FIGS. 5–11 disclose schematic axial views of individual sets of cooperating sun-gears and planetary gears.
Figure 6:
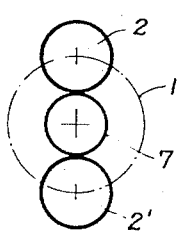

If, for instance, the gear combination according to FIGS. 5, 6 and 10 present and the second speed is switched on, the energy flows from gear 7 partly over the gears 2', 5', 6, 5, 2 and 3 to gear 11 and from there to the driven shaft 14. If the combination according to FIGS. 5, 6 and 7 are present, an energy division, as already described above, would occur in the gear group 3, 3', 10 and 11.

In the remaining still possible gear combinations and transmission steps, the process is analogous. The division of the energy flow has always the consequence that a greater number of teeth engage simultaneously and thereby the rigidity values and capacity of transmission of the gear set is increased.

In the present invention it is possible to adjust the gear set with the shown gear combinations to the desired or required conditions concerning the tooth wear and always the smallest possible number of planetary gears can be achieved. It is possible thereby, to avoid the arrangement of a plurality of pairs of coupled planetary gears with different number of teeth (step gears).

In addition to the described embodiments still further constructive embodiments are possible, which, however, all fall into the framework of the present invention, as long as they have their essential characteristics.

It should be mentioned also that any selected starting coupling and any torque converter, respectively, can be preset to the planetary gear drive of the present invention.

While I have disclosed several embodiments of the present invention, it is to be understood that these embodiments are given by example only and not in a limiting sense, the scope of the present invention being determined by the objects and the claims.

I claim:
1. A planetary wheels-change-gear drive having four forward drives and a reverse drive for automotive vehicles, comprising
   a housing,
   an input shaft and an output shaft, both said shafts being coaxially rotatably mounted in said housing,
   a plurality of planetary gears,
   a web for rotatably mounting said planetary gears about the axis of said shafts,
   a first sun gear having outer teeth and operatively connected with said input shaft,
   a ring sun gear having inner teeth,
   a third sun gear having outer teeth,
   said first ring and third sun gears being rotatably mounted about the axis of said shafts,
   means for coupling said ring and third sun gears individually as well as jointly with said output shaft,
   said planetary gears including at least one first planetary gear, at least one second planetary gear, and at least one third planetary gear,
   said first planetary gear engaging said first sun gear and coaxially mounted with said second planetary gear,
   said ring and third sun gears engaging simultaneously said second planetary gear,
   said first planetary gear having a diameter different from that of said second planetary gear,
   said first planetary gear being rigidly connected with said second coaxially disposed planetary gear,
   means for braking said web to said housing,
   a second sun gear,
   additional means for braking said second sun gear to said housing, and
   said third planetary gear having greater width than that of the other of said planetary gears and engaging said second sun gear as well as said first planetary gear.

2. The planetary wheels-change-gear drive, as set forth in claim 1, which includes
   a free wheel friction pawl gear preventing a reverse rotation and connecting said web with said housing.

3. The planetary wheels-change-gear drive, as set forth in claim 1, which comprises
   a plurality of said first planetary gears and a plurality of said second planetary gears,
   said plurality of said first planetary gears engages said first sun gear,
   said plurality of said second planetary gears engages said ring and third sun gears, and
   among said plurality of said first and second planetary gears, one pair only of said coaxially disposed gears is rigidly connected together, while the remaining pairs of planetary gears are independently rotatably mounted on said web.

4. The planetary wheels-change-gear drive, as set forth in claim 1, which includes
   a single first planetary gear,
   at least two second planetary gears distributed over the periphery, and
   one of said second planetary gears is rigidly connected with said single first planetary gear.

5. The planetary wheels-change-gear drive, as set forth in claim 1, which includes
   a single first planetary gear,
   two third planetary gears disposed on opposite sides of said single first planetary gear and engaging the latter and said second sun gear, and
   said second sun gear is securable to said housing by braking means.

6. The planetary wheels-change-gear drive, as set forth in claim 1, wherein said first, second and third planetary gears are partly singularly and partly at least in two's and are distributed over the periphery.

7. The planetary wheels-change-gear drive, as set forth in claim 1, wherein
at least one of said planetary gears is asymmetrically disposed, and
at least one counter weight for balancing the masses being disposed diametrically opposite said asymmetrically disposed planetary gear.

References Cited

UNITED STATES PATENTS

| | | | |
|---|---|---|---|
| 2,194,954 | 3/1940 | Ravigneaux | 74—761 |
| 2,549,125 | 4/1951 | Paton | 74—763 X |
| 2,764,904 | 10/1956 | Kummick | 74—763 |
| 2,854,862 | 10/1958 | Foerster | 74—763 X |

ARTHUR T. McKEON, *Primary Examiner.*